United States Patent
Fawley

(10) Patent No.: US 7,534,321 B2
(45) Date of Patent: May 19, 2009

(54) SYSTEM FOR JOINING SECTIONS OF COMPOSITE REINFORCED LINE PIPE

(75) Inventor: Norman C. Fawley, San Luis Obispo, CA (US)

(73) Assignee: NCF Industries, Inc., Cayucus, CA (US)

( * ) Notice: Subject to any disclaimer, the term of this patent is extended or adjusted under 35 U.S.C. 154(b) by 465 days.

(21) Appl. No.: 10/354,491

(22) Filed: Jan. 29, 2003

(65) Prior Publication Data

US 2004/0145179 A1    Jul. 29, 2004

(51) Int. Cl.
B29C 65/00 (2006.01)
F16L 55/18 (2006.01)

(52) U.S. Cl. ............ 156/304.1; 156/304.2; 156/304.3; 138/97

(58) Field of Classification Search ............ 156/304.1, 156/304.2, 304.3; 138/97–99, 153, 172; 285/55, 222.1, 222.2, 222.3, 222.4, 222.5
See application file for complete search history.

(56) References Cited

U.S. PATENT DOCUMENTS

| | | |
|---|---|---|
| 2,924,546 A | 2/1960 | Shaw |
| 2,930,406 A | 3/1960 | Galloway |
| 3,053,724 A | 9/1962 | Galloway |
| 3,467,412 A | 9/1969 | Gore et al. |
| 3,612,580 A | 10/1971 | Jones |
| 3,719,230 A * | 3/1973 | Kemp et al. .................. 166/376 |
| 4,023,834 A | 5/1977 | Ewing et al. |
| 4,257,630 A | 3/1981 | Bartell et al. |
| 4,514,245 A * | 4/1985 | Chabrier ...................... 156/161 |
| 4,559,974 A | 12/1985 | Fawley |
| 4,595,607 A * | 6/1986 | Betteridge et al. ........... 427/185 |
| 4,676,276 A * | 6/1987 | Fawley ........................ 138/172 |
| 4,732,412 A | 3/1988 | van der Linden |
| 5,300,356 A * | 4/1994 | Dempster et al. ........... 428/220 |
| 6,336,983 B1 | 1/2002 | Fawley |

FOREIGN PATENT DOCUMENTS

| | | |
|---|---|---|
| CA | 2181497 | 1/1998 |
| CA | 2299644 | 8/2001 |
| JP | 56150694 | * 11/1981 |
| JP | 61025673 | * 2/1986 |
| JP | 61025673 | * 4/1986 |

(Continued)

OTHER PUBLICATIONS

Zimmerman, T., "Composite Reinforced Line Pipe (CRLP) for Onshore Gas Pipelines", International Pipeline Conference and Exposition 2002.*

(Continued)

*Primary Examiner*—Justin Fischer
(74) *Attorney, Agent, or Firm*—Blakely, Sokoloff, Taylor & Zafman, LLP

(57) ABSTRACT

A composite reinforced line pipe is manufactured by aligning first and second pipe segments each having a composite reinforcement wrapped circumferentially about a core, attaching the line pipes at a cut-back portion of their exposed core, wrapping a joint tape circumferentially about the cut-back portion, wrapping a resin reinforcement tape circumferentially about the joint tape, and curing the joint tape and resin reinforcement tape.

9 Claims, 6 Drawing Sheets

FOREIGN PATENT DOCUMENTS

| | | | |
|---|---|---|---|
| JP | 2000179752 | * | 6/2000 |
| WO | WO 96/29535 | * | 9/1996 |

OTHER PUBLICATIONS

Translation of Wilhelm (WO 96/29535).*
Figure from DE 19509782.*

Tom Zimmerman, Gary Stephen and Alan Glover, *Composite Reinforced Line Pipe (CRLP) for Onshore Gas Pipelines*, Presentation, Dec. 2001, 35 pgs.

* cited by examiner

SYSTEM FOR JOINING SECTIONS OF COMPOSITE REINFORCED LINE PIPE

BACKGROUND OF THE INVENTION

1. Field of the Invention

The invention relates to the field of composite materials. In particular, the invention relates to long distance pipelines reinforced with a composite wrap for use with high-pressure fluids and gases.

2. Related Art

High pressure fluid and gas transport systems exist for the movement of e.g., natural gas and other fluids from the field to market. All metal pipelines provide a traditional system solution, but are becoming more expensive to manufacture and install as the pressure and distance requirements increase over time. As the pressure requirements increases, so to does the weight per foot of the pipelines. Transport and installation becomes more difficult as the weight of these pipes increases. The pipelines also suffer from vulnerability to physical damage during transport and to catastrophic crack propagation. Other challenges include corrosion due to the environment and stress corrosion caused by reaction of the transported gas or fluid with the material of the pressure vessel or the pipeline material with the external soil.

Traditional practice attempting balance the economics of gas transport and pipe manufacturing focuses on producing stronger and stronger pipe steel with thinner wall thickness and greater diameter. Unfortunately, these stronger steels tend to suffer from increased brittleness, corrosion, and difficulties associated with welding, bending and laying during installation.

BRIEF DESCRIPTION OF THE DRAWINGS

The invention is illustrated by way of example and not by way of limitation by the figures of the accompanying drawings in which like references indicate similar elements. It should be noted that references to "an" or "one" embodiment in this disclosure are not necessarily to the same embodiment, and such references mean at least one.

DETAILED DESCRIPTION OF THE EXAMPLE EMBODIMENTS

Assembly in the field of durable, high strength, and lightweight piping, is made possible through the use of reinforcement at the joint. Some of the various options for the reinforcement are discussed below. In an example embodiment, the first ends of two composite wrapped steel pipes are cutback and welded together. Typically, the weld will be x-rayed to insure the weld is good. The cutback area is shot blasted, primed, and wrapped circumferentially with a joint tape. A woven fabric is then wrapped circumferentially around the joint to prevent circumferential cracking during subsequent cure of the reinforcement joint tape. Thus, the cured reinforcement joint tape at the joining of the two pipes results in continuity of the pipes' composite reinforcement. As a result of lower density of the fibrous material as wound in the field, coupled with the desire to over match at the joint to prevent failure, the joint reinforcement is typically thicker than the composite reinforcement residing on the remainder of the pipe.

At least three options are available for the reinforcement joint tape. In one embodiment, an uncured prepreg material can be wound on at the joint and then cured. Alternatively, a cured clock spring material can be adhered to the joint area with a suitable adhesive. This also requires filler to permit a smooth layout, because the weld at the joint is bigger than the adjacent pipe segments. As one example, a putty material can be used as the filler. As a third alternative, a cured snaptite material may be adhered to the pipe at the joint with a suitable adhesive. This option also requires a filler material to accommodate the weld. As an additional option, a field applied a wet joint tape may be applied using a suitable wrapping machine.

Figure 1:
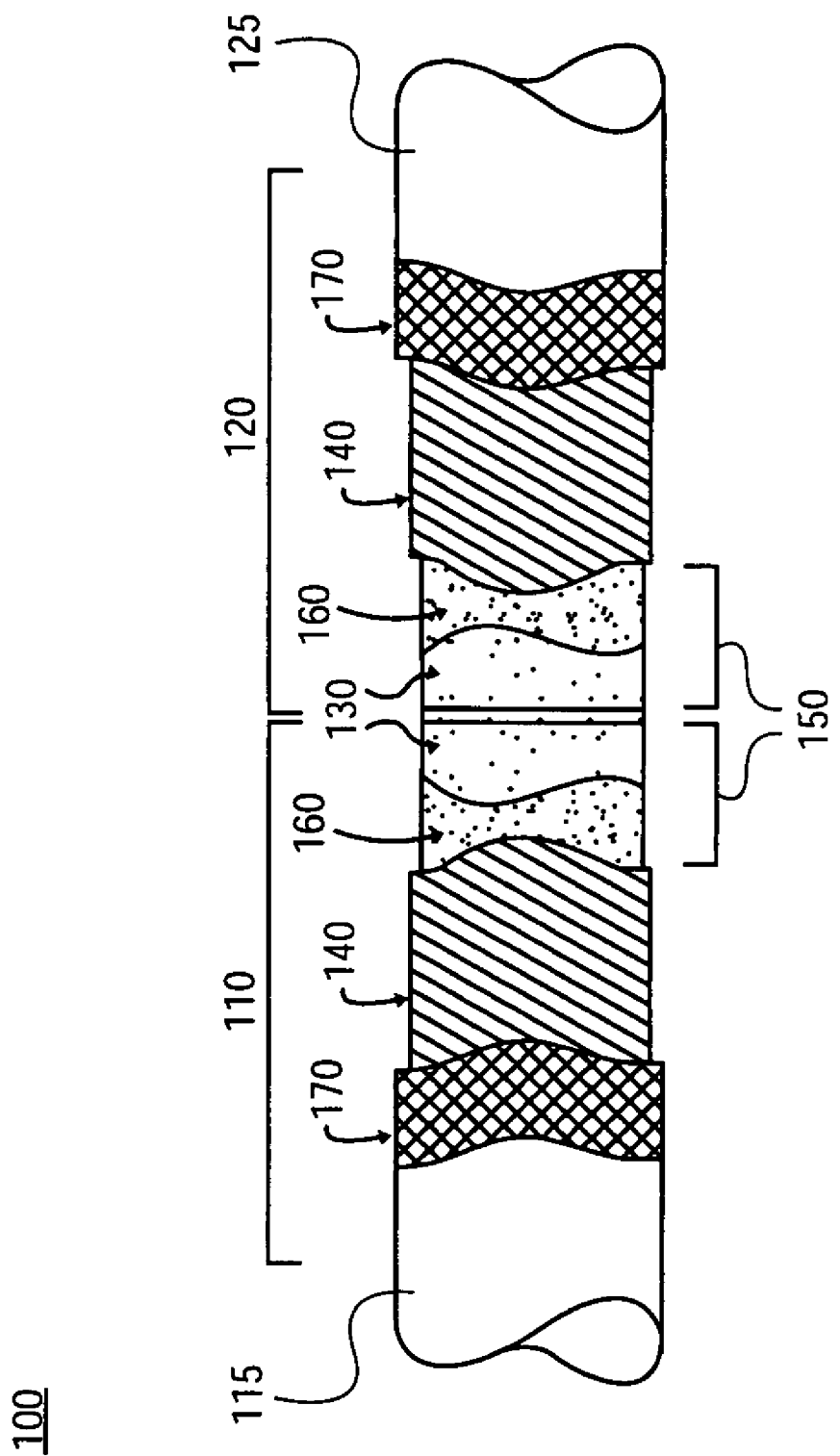
FIG. 1 is a side cut away plan view of an embodiment of the invention.

FIG. 1 shows a cut away view of an embodiment of the joined pipe segments 100. The first ends (110, 120) of first and second pipe segments (115, 125) are shown aligned and joined. The pipe segments (115, 125) have a steel core 130. In an alternative embodiment, the core 130 may be made of any metal, metal alloy, or elastic metal composite. Examples of metal include, but are not limited to, aluminum, steel, stainless steel, carbon steel, monel, inconel, hastelloy, and titanium. The material need not be manufactured exclusively of metal or metal alloys, however. Some combination of metal, metal alloy or other material might be used that together exhibit impermeability to high pressure natural gas and its constituents or suitability for whatever pressurized gas or fluid is to be transported. In an alternative embodiment, the metal core may be impermeable to other gases or liquids. As such, any manner of material or a combination of materials might be used that exhibit these characteristics for the core 130.

The core 130 may be shot blasted to remove surface contamination and improve adhesive characteristics at the surface. The core 130 is always to be coated with a primer 160. The primer 160 may be any compatible isopolyester, vinylester or a combination thereof which has been shown to exhibit beneficial strength characteristics and resistance to corrosion. In an example embodiment, AOC 5017 primer may be used. In other embodiments, the primer may be selected from any number of commercial types of products including GP Ortho, Laminating-iso, or Brom Vinyl Ester primers. It is desirable that the selected primer provide a compatible adhesion surface for epoxies and urethanes.

The composite reinforcement 140 wrapped circumferentially around the core 130 is shown removed at the cut-back portion 150. Composite reinforcement 140 may be made with a isopolyester resin matrix with E glass fibers. Alternatives to E-glass in the composite reinforcement 140 includes S-glass, S-2 glass, ECR and A-glass. In another approach, any fibers with similar strength and elasticity characteristics may be used. For systems used in warm weather environments, the isopolyester resin may be AOC 701 isopolyester resin (manufactured by AOC Corporation of Collierville, Tenn.) with a 1 ½% elongation and 244° Fahrenheit heat distortion temperature. In another example embodiment, AOC 757 isopolyester may be used exhibiting a 4% elongation and 176° Fahrenheit heat distortion temperature. The appropriate elongation characteristic depends in part on the ultimate environment of the finished product. Typically, a trade off exists in isopolyester resins between heat distortion temperature characteristics and elongation characteristics. A commercial isopolyester resin mixed for a high heat distortion temperature, such as would be desired for use in high temperature environments such as those found at the equator, results in a isopolyester with lower elongation. Similarly, a commercial isopolyester mixed for a composite reinforcement 140 to be used in colder environments such as in the arctic, would result in a isopolyester with a longer elongation. A isopolyester resin demonstrating 30% elongation may be used if designing for composite use in the arctic. In an alternative embodiment, the isopolyester resin may be substituted with any resin with similar strength and elongation characteristics to support the fibers, including, but not limited to, polyester, epoxy, and polyurethane resins. In an example embodiment, the resin is manufactured using polyester fibers (resin in a fiber form). One current commercial product consisting of polyester/polypropylene in fiber form is sold as Twintex™, available from Saint-Gobain Vetrotex America in Maumee, Ohio, USA. In this manner, the joined pipe segments 100 may be post cured by bringing the assembly through a heat tunnel at 450° Fahrenheit thereby melting the polypropolene or polyester.

Composite reinforcement 140 is shown with fibers running substantially in the circumferential direction with relatively few perpendicular fibers. Thus, most of the strength conferred to the core 130 is reserved for hoop stresses. In an alternative embodiment, the composite reinforcement 140 does not have the fibers running substantially the circumferential direction with relatively few perpendicular fibers, but rather fibers of sufficient density, number, and strength when wrapped to provide desired hoop strength assistance for the core 130.

A resin reinforcement tape may be made of fabric 170 that is woven, stitched or laid and is shown wrapped circumferentially about composite reinforcement 140. For simplification, subsequent references are to woven fabric, but that fabric could alternatively be stitched or laid. The woven fabric 170 may reduce circumferential shrink cracking at the surface of the composite reinforcement 140 during cure. The woven fabric 170 may also reduce surface cracking in the composite reinforcement 140 during hydrotest. An example embodiment of woven fabric includes PPG-2026 available from PPG Industries of Pittsburg, Pa. Eighteen or twenty-four ounce woven fabric in a standard 5×4 configuration may also be used. In an alternative embodiment, the resin reinforcement tape made of woven fabric 170 may be replaced with ±90 degree stitched fabric. In another alternative embodiment, the fabric maybe a stitched or laid fabric or an 80/20 warp and weft woven fabric. Tri Ax fabric may also be used. It may be appreciated that other woven, stitched, or laid materials may be used to provide bi-axial or warp dominated fiber geometry. Also of concern is the ability of the woven fabric 170 or substitute material to wick up resin from the underlying composite reinforcement 140 prior to cure. A tighter weave such as Tri Ax fabric may not be as ideal to wick up resin due to the density of the weave. If desired, a parallel weft and remay stitched polyester fabric may be added as a veil to protect the fibers from the effects of the sun and weathering. A layer of plastic film may also be applied to prevent dripping of the resin from the assembly prior to cure (not shown). The plastic film may also be stretched during application so as to apply compressive pressure to the reinforcement during cure. Additionally, the plastic rounds off the edges of the joint to reduce snags and otherwise facilitate handling as the pipe is installed.

Figure 2:
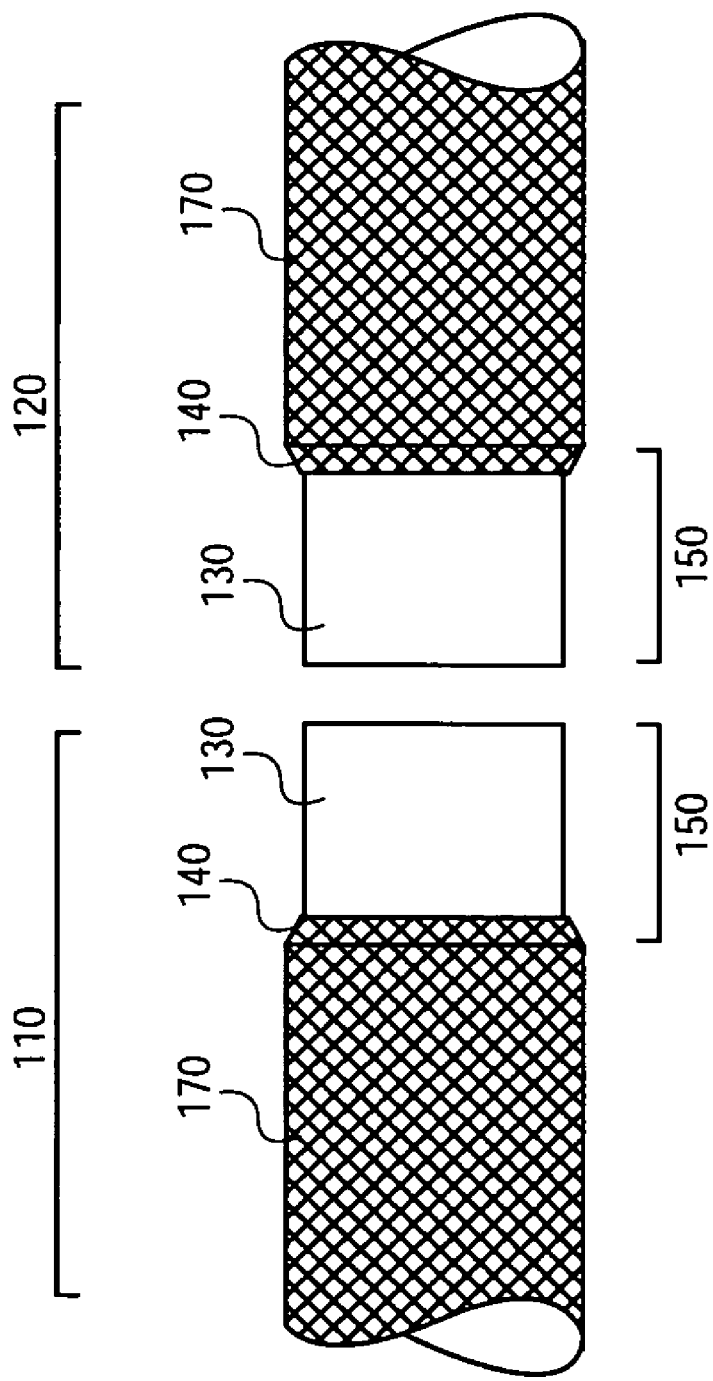
FIG. 2 is a side plan view of any example embodiment showing two pipe segments prior to joining.

FIG. 2 shows first end 110 and second end 120 prior to alignment and joining. Woven fabric 170 and composite reinforcement 140 have been cut-back to expose core 130 to allow the joining. In cold environments, it is desirable to preheat the metal core typically to 200° F.-300° F. This preheating drives off moisture and provides a dry surface for subsequent welding and reinforcement adhesion. First end 110 and second end 120 may be welded together using weld material that is stronger than the core 130. More weld material is also used than would otherwise be required. Use of the stronger material, at a greater volume, results in an overmatching of the weld. The welding of the core 130 at the cut-back portion 150 may be performed with any known welding process, including, tungsten inert gas (TIG) welding, manual metal arc (MMA) welding, gas metal arc (MIG) welding, flux cored arc (FCA) welding, automated orbital hyperbaric welding, arch welding, plasma welding, friction welding, explosive welding, or any of a variety of mechanical connectors may be used. In an alternative embodiment, when steel is not used for the core 130, any appropriate joining technique may be used. The core 130 at the cut-back portion 150 may then be shot primed. The primer (see FIG. 1, reference numeral 130) may be a isopolyester which has been shown to exhibit beneficial strength characteristics and durability. Similar to the description above, an example embodiment may include any epoxy-based resin. The primer may also be selected from any number of commercial types of products including GP ortho, Laminating-Iso or Brom vinyl ester. The primer should be selected to be compatible with the resin in the joint reinforcement.

Figure 3:
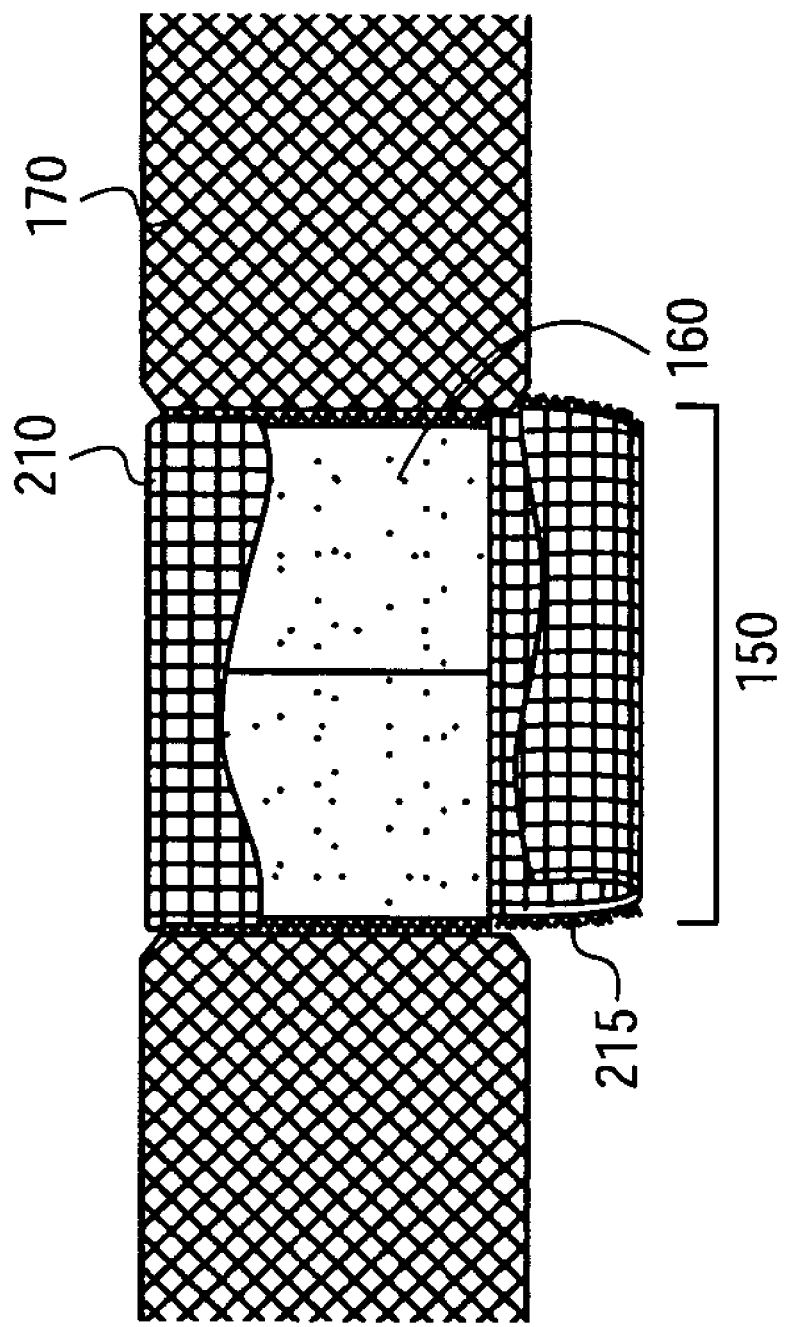
FIG. 3 is a side plan view showing an example method of an embodiment of the invention.
Figure 4:
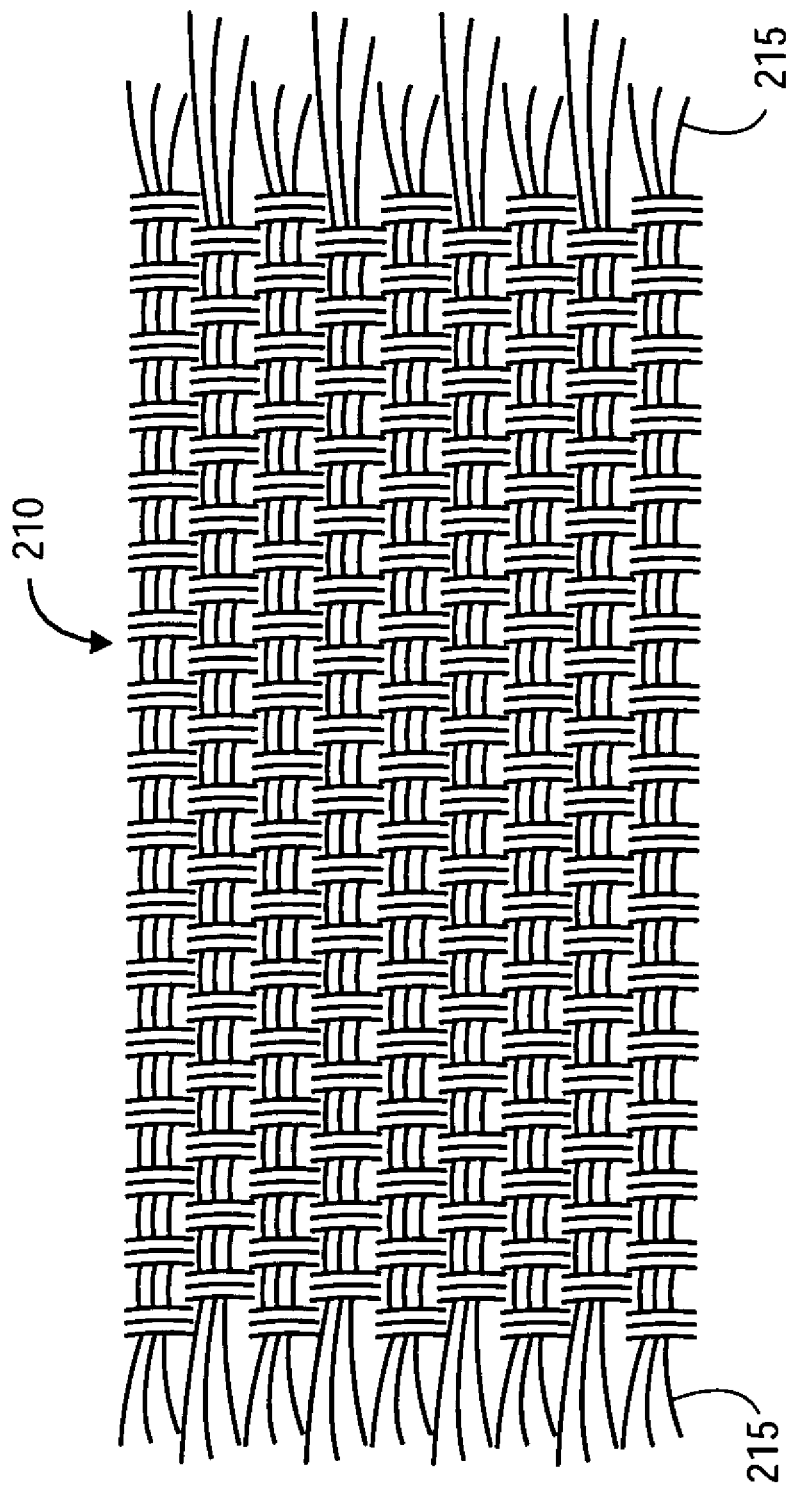
FIG. 4 is a plan view showing an example embodiment of a joint tape.
Figure 6:
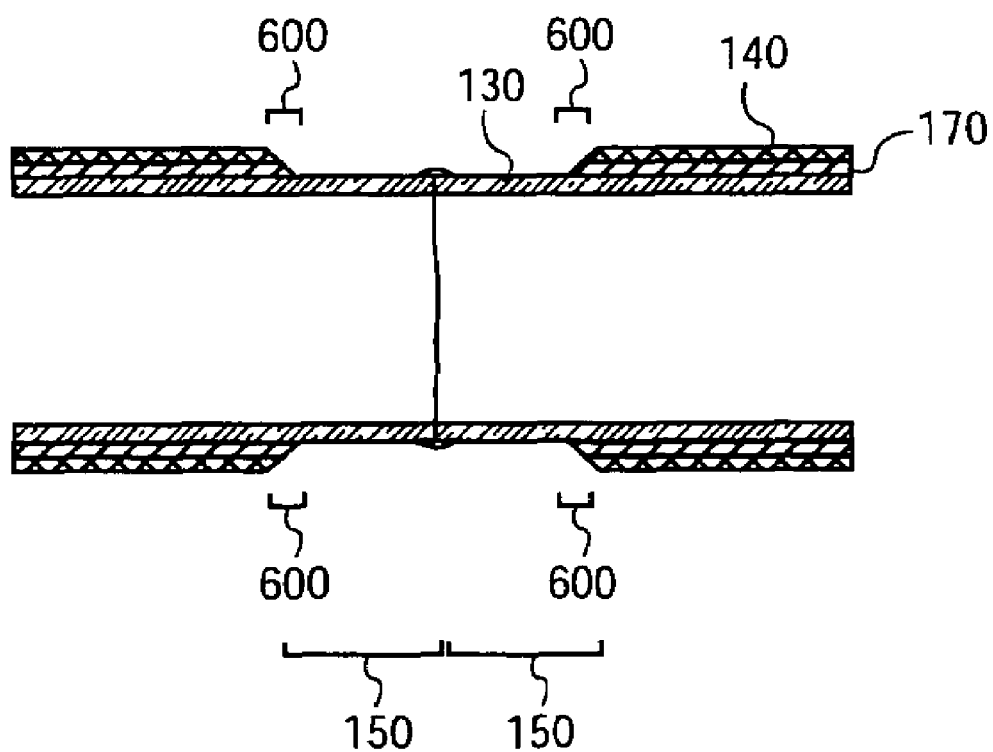
FIG. 6 is a side cut away plan view of the cut back portion of an embodiment of the invention

FIG. 3 shows application of the joint tape 210 over primer 160 at the cut-back region 150. The joint tape 210 may be manufactured of a 80/20 warp and weft woven joint tape with the same fibers as described above for composite reinforcement 140. The joint tape 210 may be manufactured with several warp fibers removed from each side of joint tape 210 to provide joint tape tails 215 out of the weft fibers that then remain extended out from joint tape 210 (See FIG. 4). In one embodiment, 80% of the fibers are warp fibers and 20% are weft fibers. In such an embodiment, the 20% weft fibers form the tails 215 and ties into the composite reinforcement on the core. The joint tape tails 215 may be used to facilitate filling the wedge portion 600 created from the cut back of woven fabric 140 and composite reinforcement 170 (see FIG. 6). More specifically, the tails tie into the existing composite reinforcement on the core. Hot melt may be provided along joint tape 210 in both warp and weft directions to facilitate maintaining the fiber geometries when resin is applied as the joint tape 210 is rolled and stored prior to transfer to the job site and application. In this manner, with appropriate isopolyester resin utilized, joint tape 210 may drawn through a resin bath, rolled, stored, and transported to a job site for application and curing with reduced bagging and deformation of the fibers due to the resin sitting in the joint tape 210 prior to application. In embodiments in which the resin is pre-impregnated into the joint tape, a thicker "paste" is desirable to prevent the resin from draining out during transportation and handling. In an alternative embodiment, the joint tape 210 may be manufactured with a warp uni cloth with the fibers running circumferentially upon wrapping and hot melt running both perpendicular and parallel to the fibers of the cloth to hold the fibers in place. In another alternative embodiment, any composition of bi-directional or warp dominated fibers may be used that allow for sufficient strength and for appropriate elasticity. In another alternative embodiment, the joint tape 210 may be manufactured with the resin using polyester fibers (resin in a fiber form). This would obviate the need for the joint tape to be drawn through a resin bath prior to rolling and storing. One current commercial product consisting of polyester/polypropylene in fiber form is sold as Twintex™. Use of Twintex™ as the joint tape requires consolidation and may require an external heat source in addition to the internal induction heating because no exothermic reaction is induced by heating the Twintex™.

The joint tape 210 may be built up by hand wrapping the core 130 with a wrap width approximating the width of the cut back region 150 with the joint tape tails 215 extending into the width increases created by the cut back portion 150. In an alternative embodiment, narrower or wider wrap widths may be used. The joint tape 210 may be built up to a thickness of approximately 1 ½-2 times the thickness of the composite reinforcement. Thus, thickness of the resulting joint tape 210 is often thicker than the composite reinforcement 170, recognizing that more resin may exist per unit volume with the joint tape 210 verses the composite reinforcement 170 due to possible different application methods and materials. The thickness variance is exacerbated where precured materials are used, because they lack the consolidation of wet wound materials. In an alternative embodiment, the joint tape 210 is barber poled around the core 130 using a suitable wrapping mechanism. As stated above for the composite reinforcement 140, although the invention may use 4% elongation resin, more elastic resins such as 30% elongation resin may be used depending on weathering characteristics desired. In an alternative embodiment, CHP activated resin, BPO resin, or mixed catalyst resin may be used for joint tape 210 to allow transport of the rolled joint tape 210 to a job site for application prior to curing. While most prepreg material requires refrigeration to prevent the onset of cure, using an AOC 701 resin, a prepreg that remains stable at 70° F., but cures in less than five minutes at 250° F. can be created. In such a configuration, the joint tape 210 may be prepared, rolled, and stored for at least approximately three months at room temperature prior to arriving at the job site for application.

Figure 5:
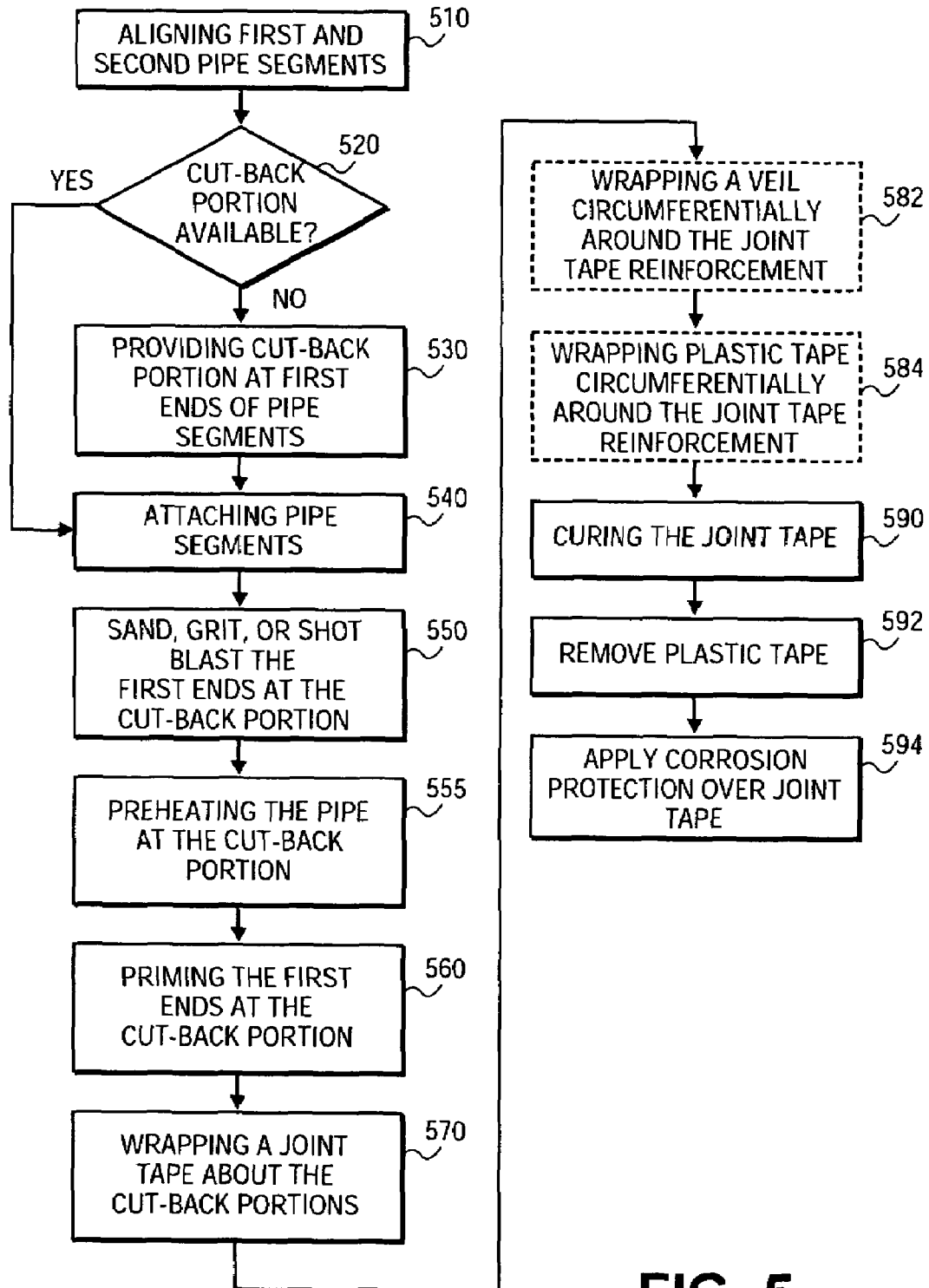
FIG. 5 is a flow diagram describing an example method of an embodiment of the invention.

FIG. 5 is a flow chart showing the method for joining sections of composite reinforced line pipe. The first pipe segment 115 is aligned with the second pipe segment 125 at their first ends 110, 120 (block 510). If a cut-back portion is available (block 520), the pipe segments 115, 125 are attached (block 540). In one embodiment, attachment is accomplished using conventional welding techniques as discussed above. If the cut-back portion 150 is not available, the composite reinforcement 140 and woven fabric 170 may be cut back exposing the core 130 (block 530). In an alternative embodiment, the cut back of composite reinforcement 140 and woven fabric 170 may not result in a wedge portion 600 (see FIG. 6) but rather a perpendicular cut extending to core 130. The core 130 may then be sanded, grinded or shot blasted at the cut-back portion 150 (block 550) to clear and prepare the area. In an alternative embodiment, the core 130 may be subjected to metallic abrasives or provided with a similar surface treatment.

The core 130 may be preheated to approximately 200-300 degrees Fahrenheit to remove excess moisture and to kick off the cure of composite reinforcement 140 during subsequent application. It may be appreciated that the temperature used to remove excess moisture is not critical, but should be great enough to kick off the cure of composite layer 140 while allowing primer 160 to become tacky (see below). More heat or less heat may be utilized. In one embodiment, the heat is applied to either side of the weld to insure more uniform heat distribution and improve catalytic response. The core 130 may then be primed (block 560). The primer 160 may become tacky in approximately 2-10 minutes. In an alternative embodiment, as stated above, the primer 160 may take a longer or shorter time to become ready for application of composite layer 140 depending on the primer utilized (see above for alternative embodiments of the primer). The joint tape 210 is then applied circumferentially about the cut-back portions 150 (block 570). In one embodiment, a spring loaded air cylinder may be used to apply pressure to consolidate the joint reinforcement material while it is wound onto the joint. This application of pressure both improves the density of the material and minimizes wrinkling of the layers as applied. In an alternative embodiment, a polyester veil may be wrapped circumferentially around the assembly at the cut back portion 150 to provide further protection of the fibers from the environment (block 582). A plastic tape may also be wrapped circumferentially around the assembly to reduce dripping of resin into the environment (block 584). Suitable tapes include polyvinyl alcohol (PVA), nylons and polyesters.

The joint tape 210 and woven fabric 140 may then be cured (block 590) through the application of heat. In an example embodiment, heat is implied to the joint tape 210 by heating the metallic core 130 with an induction heater placed adjacent to the composite reinforced line pipe 100. The induction heater may heat the core 130 to approximately 350 degrees Fahrenheit to allow the exterior of the curing joint tape 210 to approach 250 degrees Fahrenheit. It may be appreciated that application of less heat will result in a longer cure period. Application of more heat will result in a faster cure period. If the joint tape 210 resin is such that means other than heat are used to cure, appropriate methods of cure may be utilized. Once cured, the plastic tape may be removed (block 592). While the cured product provides corrosion resistance, any suitable additional corrosion protection may be applied over the joint tape is desired (block 594). Once corrosion protection is optionally applied, the pipe is ready for hydrotesting and if it passes, final installation.

In the foregoing specification, the invention has been described with reference to specific embodiments thereof. It will, however, be evident that various modifications and changes can be made thereto without departing from the broader spirit and scope of the invention as set forth in the appended claims. The specification and drawings are, accordingly, to be regarded in an illustrative rather than a restrictive sense.

I claim:
1. A method comprising:
   aligning first and second pipe segments at a first end of each respective pipe segment, each pipe segment having a core and a composite reinforcement comprising a resin matrix with reinforcement fibers wrapped circumferentially around a substantial length of the core, each pipe segment further having a cut-back portion at the first ends in which the core is exposed;
   attaching the first pipe to the second pipe at the first ends;
   wrapping a composite joint tape circumferentially around the first pipe and second pipe at
   the cut-back portions such that fibers of the composite joint tape run substantially in a circumferential direction to provide hoop reinforcement to the first and second pipe segments at the cut-back portions; and
   curing the composite joint tape by heating the core to kick off cure of a resin in the composite joint tape.
2. The method of claim 1 further comprising:
   preheating the first pipe and the second pipe at the cut-back portion of the first ends.
3. The method of claim 1 further comprising:
   priming the first ends at the cut-back portions.
4. The method of claim 1 further comprising:
   wrapping a resin saturated reinforcement tape circumferentially around the joint tape to prevent surface cracking of the joint tape.

5. A method comprising:
aligning first and second pipe segments at a first end of each respective pipe segment, each segment having a metallic core and a composite reinforcement circumferentially surrounding the core, each pipe segment further having a cut-back portion at the first ends in which the core is exposed;
attaching the first pipe to the second pipe at the first ends;
wrapping a composite joint tape circumferentially around the first pipe and second pipe at the cut-back portions; and
curing the composite joint tape by heating the metallic core to kick off cure of a resin in the composite joint tape.

6. The method of claim 5 further comprising:
shot blasting the first ends at the cut-back portions; and
priming the first ends at the cut-back portions.

7. The method of claim 5 wherein attaching comprises:
welding together the metallic cores at the first ends of reach respective pipe segment.

8. The method of claim 5 further comprising:
wrapping a resin reinforcement tape circumferentially around the composite joint tape.

9. The method of 5 wherein heating comprises:
heating by induction.

* * * * *